UNITED STATES PATENT OFFICE.

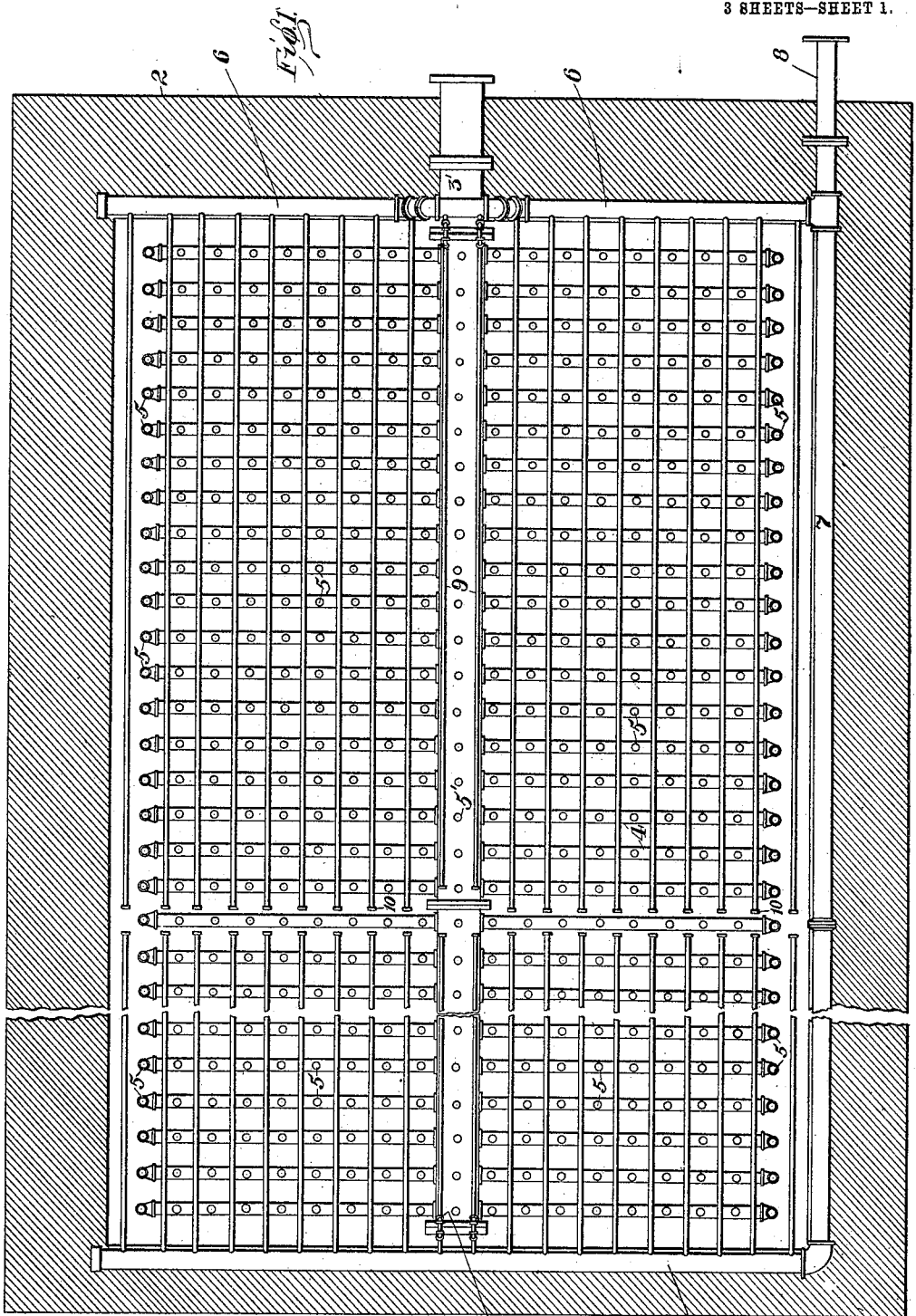

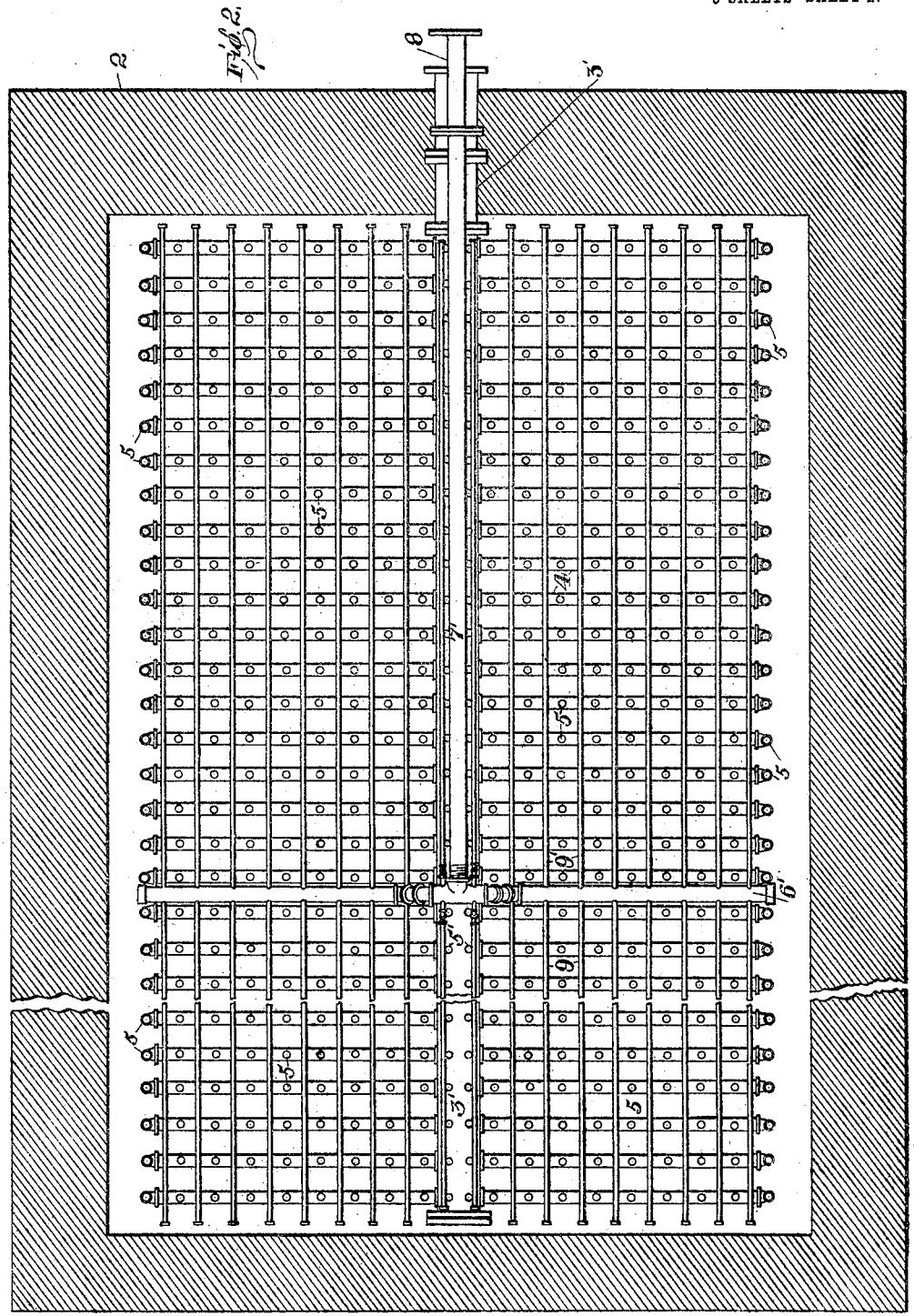

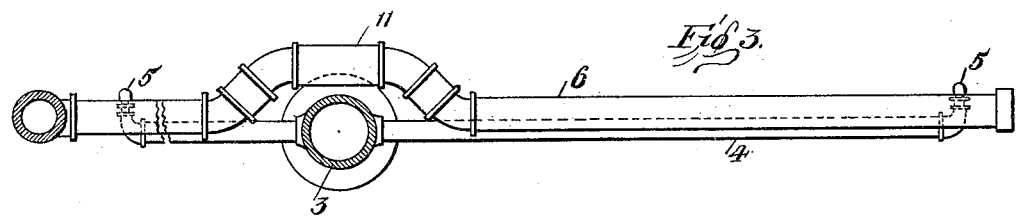
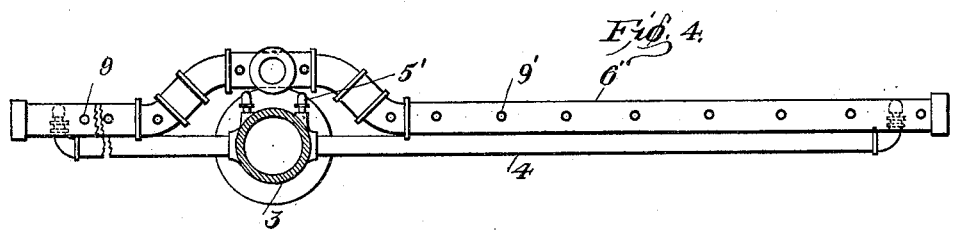
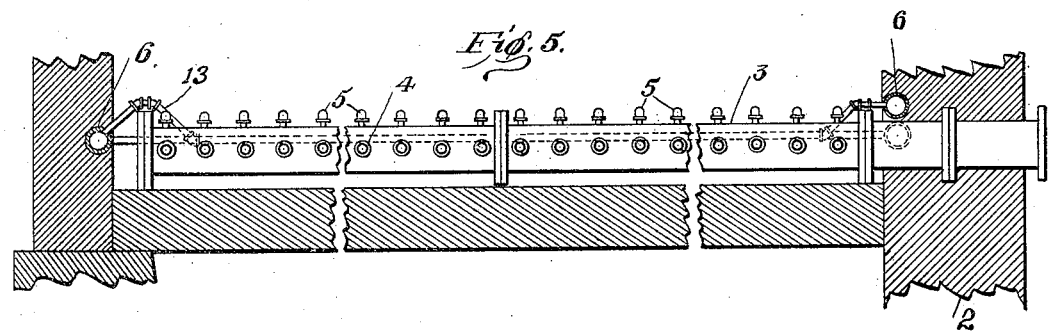
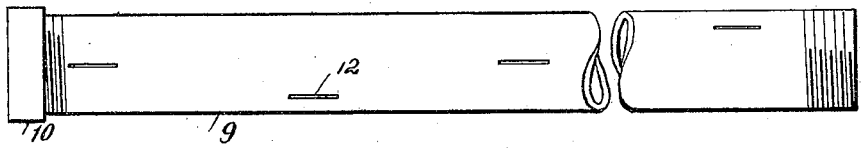
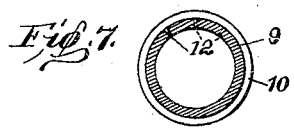

JAMES B. GREER, OF PITTSBURG, PENNSYLVANIA.

FILTERING APPARATUS.

No. 799,983.   Specification of Letters Patent.   Patented Sept. 19, 1905.

Application filed February 14, 1905. Serial No. 245,567.

*To all whom it may concern:*

Be it known that I, JAMES B. GREER, of Pittsburg, Allegheny county, Pennsylvania, have invented a new and useful Filtering Apparatus, of which the following is a full, clear, and exact description, reference being had to the accompanying drawings, forming part of this specification, in which—

Figure 1 is a plan view, partly broken away, showing one form of my improved system. Fig. 2 is a similar view showing another form. Fig. 3 is a cross-section showing the pipe system of Fig. 1. Fig. 4 is a similar cross-section, showing the pipe system of Fig. 2. Fig. 5 is a longitudinal section, partly broken away, of the form of Fig. 1; and Figs. 6 and 7 are detail views of one of the air-pipes.

My invention relates to that class of filter-beds wherein air and water are used in washing and cleaning the bed. Heretofore in such systems the air-pipes have extended parallel with the water-pipes. I have found that by arranging the air-pipes so that they extend transversely of the water-pipes, and preferably at right angles thereto, I can obtain improved results in cleaning and washing.

In the drawings, referring to the form of Figs. 1, 3, and 5, 2 represents the inclosing structure, which may be made of cement or other suitable material. 3 is a central manifold from which the branch water-pipes 4 extend at right angles on opposite sides. These water-pipes are provided with strainers 5, which are spaced at suitable intervals apart throughout their length. 6 6 are air-pipes at each end of the bed and preferably embedded in the cement inclosure, as shown in Fig. 5. These air-pipes may be connected by the longitudinal pipe 7 and may receive the air-supply from pipe 8 or any other suitable connection. From the end pipes 6 6 extend the branch air-pipes 9, which are preferably provided with closed ends adjacent to each other, as shown at 10. One of the end pipes may be bent upwardly in its central portion, as shown at 11, Fig. 3, to clear the water-manifold. The branch air-pipes are perforated or slotted, as shown at 12 in Figs. 6 and 7. These slots are preferably arranged in staggered position and are preferably adjacent to the strainer of the water-pipes. In this form the central air branch pipes 9' extend along the sides of the water-manifold and are connected at the ends by the curved pipes 13, which extend over the flanged joints of the water-pipe.

In the use of the apparatus during the filtering operation the air-pipes are closed and the water passes down from the overlying filtering-bed of sand or suitable material, and thence through the strainers into the branch water-pipes and out through the manifold.

When the bed is to be washed, water is supplied under pressure to flow upwardly through the manifold and branch water-pipes, while air at the same time is forced through the branch air-pipes. The water and air mingle and pass upwardly through the bed, the air assisting in agitating the sand and freeing the slime and dirt.

In the form of Figs. 2 and 4 the air-pipe 7' extends centrally and longitudinally above the manifold 3', and the air-pipes 6' extend laterally from the end of the pipe 7'. From the pipes 6' the branch air-pipes 9' extend longitudinally of the bed in opposite directions and are provided with closed outer ends. In this case the pipe 6' is bent where it extends over the water-pipe, and the manifold may be provided with a series of strainers 5. It will be noted that in this case the embedding of the air-pipes in the inclosure is avoided, while at the same time the air-pipes cross the water-pipes as in the first form.

The advantages of my invention result, primarily, from arranging the perforated air-pipes transversely of the water-pipes carrying the strainers. I have found in practice that this arrangement causes a better commingling of the air and water currents and causes the washing to be more quickly and effectively carried out.

Many variations may be made in the form and arrangement of the basin or inclosure, the material of the bed, the arrangement of the pipes, &c., without departing from my invention.

I claim—

1. A washing system for filter-beds, comprising a series of water-pipes having a series of strainers, and air-pipes extending across the water-pipes at a different level and provided with perforations adjacent to the water-pipe strainers; substantially as described.

2. A washing system for filter-beds, comprising a series of parallel water-pipes provided with projecting strainers, and a series of parallel air-pipes extending across the water-pipes at a different level and having perforations adjacent to the strainers; substantially as described.

3. A filter-bed having a water-manifold extending through it with parallel branch water-pipes extending in opposite directions therefrom, said branch-pipes having a series of upwardly-projecting strainers, and parallel air-pipes extending across and above the water-pipes and having perforations located adjacent to the strainers of the branch water-pipes; substantially as described.

4. A washing system for filter-beds, comprising a series of water-pipes with upwardly-projecting strainers, and air-pipes extending across and above the water-pipes and having perforations adjacent to the strainers; substantially as described.

In testimony whereof I have hereunto set my hand.

JAMES B. GREER.

Witnesses:
  GEO. B. BLEMING,
  JOHN MILLER.